(12) United States Patent
Yuan et al.

(10) Patent No.: US 7,656,235 B2
(45) Date of Patent: Feb. 2, 2010

(54) COMMUNICATION SYSTEM AND OSCILLATION SIGNAL PROVISION METHOD

(75) Inventors: Ti-wen Yuan, Hsinchu County (TW); Chung-Shine Huang, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 57 days.

(21) Appl. No.: 11/748,004

(22) Filed: May 14, 2007

(65) Prior Publication Data

US 2008/0001681 A1 Jan. 3, 2008

Related U.S. Application Data

(60) Provisional application No. 60/806,135, filed on Jun. 29, 2006.

(51) Int. Cl.
*H03L 7/00* (2006.01)
(52) U.S. Cl. ............................ 331/2; 331/8; 331/172
(58) Field of Classification Search ............ 331/172, 331/18, 2
See application file for complete search history.

(56) References Cited

U.S. PATENT DOCUMENTS

| 5,918,061 | A | * | 6/1999 | Nikjou | .................. 713/324 |
|---|---|---|---|---|---|
| 6,927,641 | B2 | | 8/2005 | Terasawa et al. | |
| 2004/0132421 | A1 | | 7/2004 | Underbrink | |
| 2005/0239417 | A1 | | 10/2005 | Boos | |

FOREIGN PATENT DOCUMENTS

| WO | 9917438 A1 | 4/1999 |
|---|---|---|
| WO | 0179878 A2 | 10/2001 |
| WO | 2005064965 | 7/2005 |
| WO | 2006099535 A1 | 9/2006 |

OTHER PUBLICATIONS

English Language Translation of German Office Action, mailed Feb. 17, 2009.
CN Office Action mailed Jun. 19, 2009.

* cited by examiner

*Primary Examiner*—Joseph Chang
(74) *Attorney, Agent, or Firm*—Thomas, Kayden, Horstemeyer & Risley

(57) ABSTRACT

A communication system and an oscillation signal provision method based thereon are provided. In the communication system, a high frequency oscillator generates a first high frequency signal upon receipt of an enable signal. The first high frequency signal is commonly shared by a first module and a second module. The first module is coupled to the high frequency oscillator, operating in either busy or idle mode, wherein the first module operates at the first high frequency signal when in busy mode. The second module converts the first high frequency signal to a second high frequency signal and operates at the second high frequency signal when in busy mode.

20 Claims, 6 Drawing Sheets

COMMUNICATION SYSTEM AND OSCILLATION SIGNAL PROVISION METHOD

CROSS REFERENCE TO RELATED APPLICATIONS

This application claims the benefit of U.S. Provisional Application entitled "Oscillator Sharing for multiple chips in a mobile phone," Ser. No. 60/806,135, filed on Jun. 29, 2006.

BACKGROUND OF THE INVENTION

1. Field of the Invention

The invention relates to mobile phone systems, and more particularly, to a common oscillation source simultaneously serving multiple communication chips in one device.

2. Description of the Related Art

FIG. 1 shows a conventional communication system 100. Currently, mobile phones provide various functionalities in addition to telephone communication. For example, in FIG. 1, a mobile module 110, a Bluetooth module 120 and a WiFi module 130 are simultaneously implemented in one device, each operating at different frequencies. Specifically, according to known power saving technologies, these modules may operate in either a busy mode or an idle mode, with different frequency sources required. The mobile module 110 uses a first high oscillator 112 for busy mode, and an oscillation source 114 for idle mode. Likewise, the Bluetooth module 120 and WiFi module 130 also require corresponding high and low frequency oscillators 122, 132, 124 and 134 in either mode. The disadvantage of the architecture is that since two oscillators are required for each module, circuit redundancies and costs proportionally increase when multiple modules are implemented together. Additionally, the total power consumption of the oscillators is significant. When all modules are operating in the busy mode, a power shortage may quickly occur, reducing the mobility of the communication system 100. Thus, a more efficient architecture is desirable.

BRIEF SUMMARY OF THE INVENTION

An exemplary embodiment of a communication system is provided, in which a high frequency oscillator generates a first high frequency signal upon receipt of an enable signal. The first high frequency signal is commonly shared by a first module and a second module. The first module is coupled to the high frequency oscillator, operating in either busy or idle mode, wherein the first module operates at the first high frequency signal when in busy mode. The second module converts the first high frequency signal to a second high frequency signal and operates at the second high frequency signal when in busy mode.

The high frequency oscillator may comprise a first high oscillator generating the first high frequency signal, and a first buffer amplifying the gain of the first high frequency signal before output to the first module and second module. The communication system may further comprise a low frequency oscillator, comprising an oscillation source generating a low frequency signal, and a second buffer amplifying the gain of the low frequency signal. The first module and second module are coupled to the low frequency oscillator, individually operating at the low frequency signal when in idle mode.

Alternatively, the first module can be directly coupled to the low frequency oscillator to receive the low frequency signal. The first module is coupled to the second module, amplifying and passing the low frequency signal to the second module. The first and second modules operate at the low frequency signal when in idle mode.

The second module may comprise a first PLL circuit, receiving the first high frequency signal and generating a second high frequency signal, and a Bluetooth module, coupled to the first PLL circuit, operating at the second high frequency signal in busy mode.

The first module asserts a first request signal when the first module operates in busy mode, and the second module asserts a second request signal when the second module operates in busy mode. The communication system further comprises an enablement unit, coupled to the first module and second module for generation of the enable signal. When a request signal is asserted, the enablement unit generates the enable signal enable signal to the high frequency oscillator.

The first module comprises an auto frequency controller coupled to the high frequency oscillator, generating an adjustment signal to maintain the accuracy of first high frequency signal upon receipt of the enable signal. The auto frequency controller ceases generating the adjustment signal when the enable signal is not asserted.

Another embodiment provides an oscillation signal provision method based on the communication system described, with detailed description given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
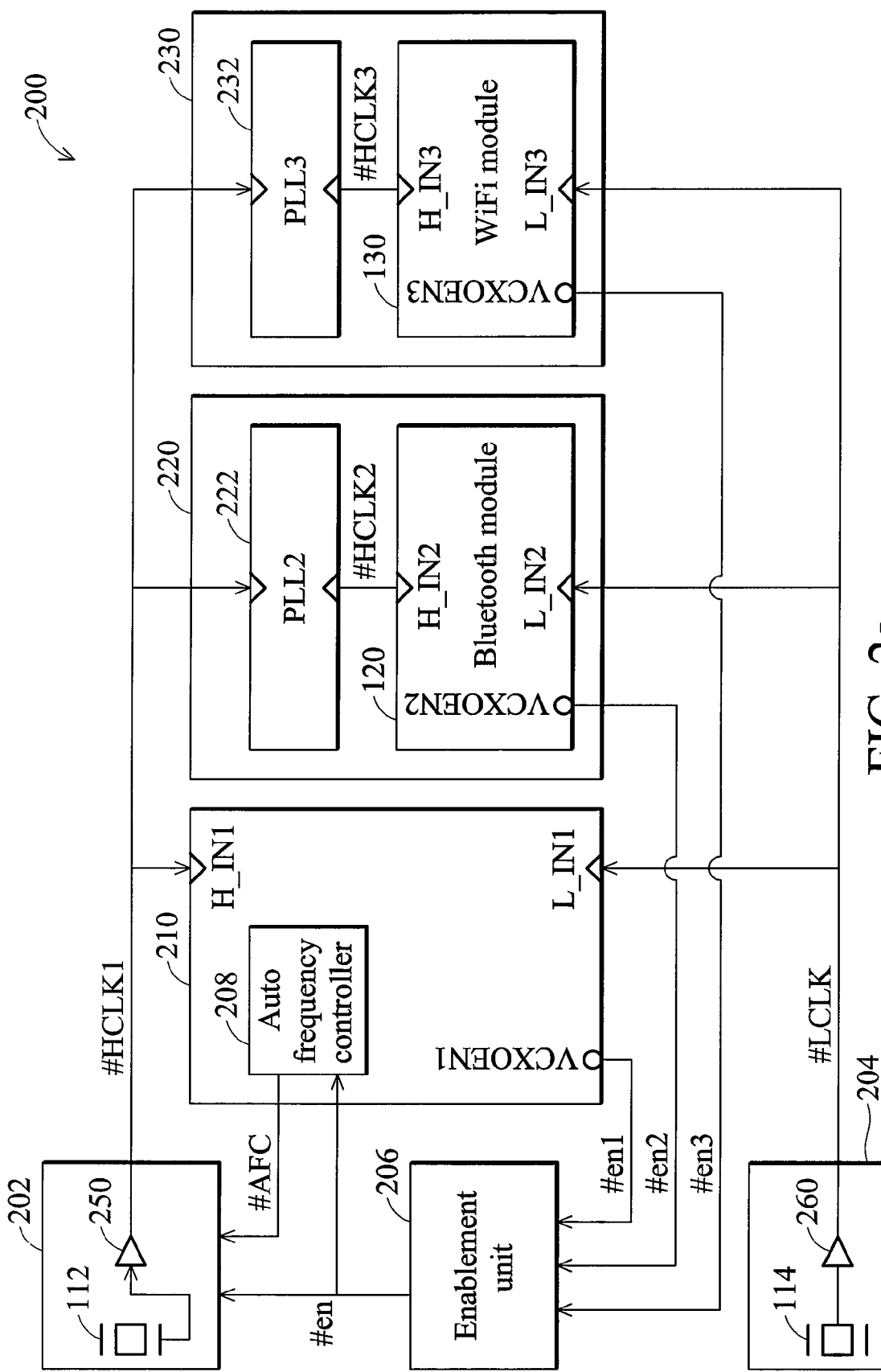
FIGS. 2a and 2b show embodiments of communication systems 200 and 201 according to the invention.
Figure 2B:
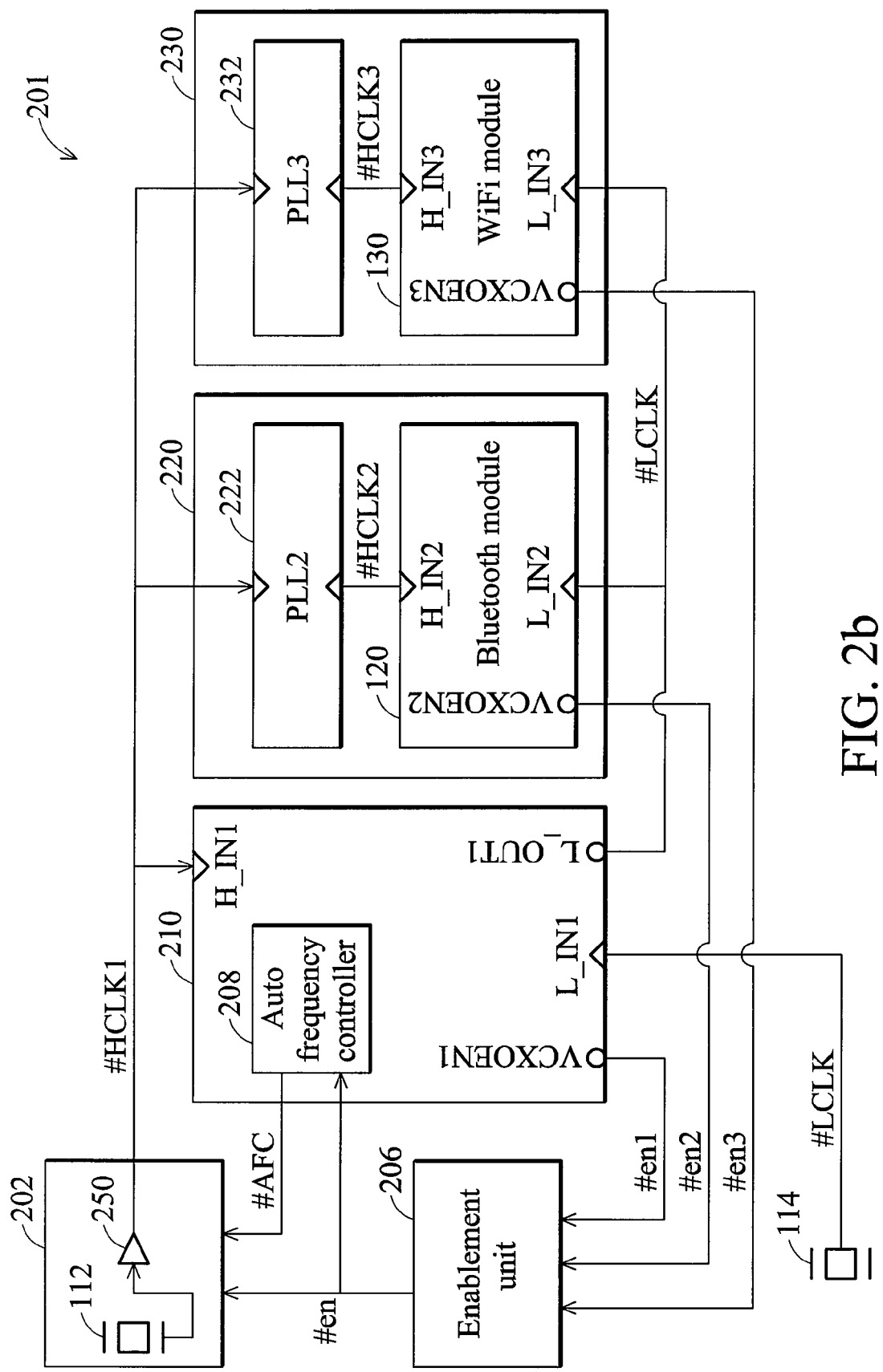

FIGS. 2a and 2b show embodiments of communication systems 200 and 201 according to the invention. In FIG. 2a, a communication system 200 comprises a first module 210, a second module 220 and a third module 230 sharing one high frequency oscillator 202 and one low frequency oscillator 204. The high frequency oscillator 202 generates first high frequency signal #HCLK1 for operations in busy mode, and the low frequency oscillator 204 generates a low frequency signal #LCLK for idle mode. The high frequency oscillator 202 is enabled by an enable signal #en sent from an enablement unit 206 coupled to the first module 210, second module 220 and third module 230. When one of the first module 210, second module 220 and third module 230 switches to busy mode, a corresponding one of request signals #en1, #en2 or #en3 is delivered to the enablement unit 206. The enable signal #en is asserted if any of the request signals #en1, #en2 and #en3 is asserted, and the high frequency oscillator 202 is enabled to generate the first high frequency signal #HCLK1.

Conversely, if none of the request signals #en1, #en2 and #en3 is asserted, the enable signal #en is not sent to enable the high frequency oscillator 202, and the high frequency oscillator 202 may cease to work, reducing the total power consumption of the communication system 200. Since the high frequency oscillator 202 is simultaneously coupled to multiple modules, the pushing power of the first high frequency signal #HCLK1 is important. The high frequency oscillator 202 comprises a first high oscillator 112 as a source of the first high frequency signal #HCLK1, and a first buffer 250 coupled to the first high oscillator 112. The first high frequency signal #HCLK1 is amplified to gain the pushing power before output to the first module 210, second module 220 and third module 230. Likewise, the low frequency oscillator 204 comprises an oscillation source 114 as a source of the low frequency signal #LCLK, and a second buffer 260 coupled to the oscillation source 114, amplifying the low frequency signal #LCLK to gain the pushing power thereof. When any of the first module 210, second module 220 or third module 230 switches to idle mode, the low frequency signal #LCLK is used for corresponding operations.

Alternatively in the communication system 201 of FIG. 2b, the low frequency signal #LCLK is provided by oscillation source 114 specially coupled to the first module 210. The second buffer 260 as shown in FIG. 2a is removed, and the low frequency signal #LCLK is amplified by the first module 210 before outputting via an output terminal L_OUT1, from which the second module 220 and third module 230 receives the low frequency signal #LCLK for idle mode operations. Generally, the low frequency signal #LCLK may range from 32 KHz to 32.768 KHz, and accuracy thereof is not strictly required. The range of low frequency signal #LCLK is not limited, and any frequency below 100 KHz may be covered to be the low frequency signal #LCLK. Conversely, the first high frequency signals #HCLK1, #HCLK2 and #HCLK3 used in busy mode are required to be accurate. The first module 210 may be a mobile phone chip following communication standard such as Global System for Mobile Communication (GSM), General Packet Radio Service (GPRS), and Enhanced Data rates for GSM Evolution (EDGE), Wideband Code Division Multiple Access (WCDMA) or Code Division Multiple Access (CDMA), and the first high frequency signal #HCLK1 is for example, 13 MHz. The second module 220 may be a Bluetooth chip using a second high frequency signal #HCLK2 of, for example, 16 MHz, and the third module 230 may be a WiFi chip using a third high frequency signal #HCLK3 of, for example, 20 MHz. Thus, the first high frequency signal #HCLK1 sent to the second module 220 and third module 230 should be converted before use. For example, the second module 220 may comprise a first PLL circuit 222, converting the first high frequency signal #HCLK1 to the second high frequency signal #HCLK2, and a Bluetooth module 120 coupled to the first PLL circuit 222, operating at the second high frequency signal #HCLK2 when in busy mode. Similarly, the third module 230 comprises a second PLL circuit 232 to generate the third high frequency signal #HCLK3 from the first high frequency signal #HCLK1, and a WiFi module 130 performing WiFi operations at the third high frequency signal #HCLK3 when in busy mode.

Figure 3:
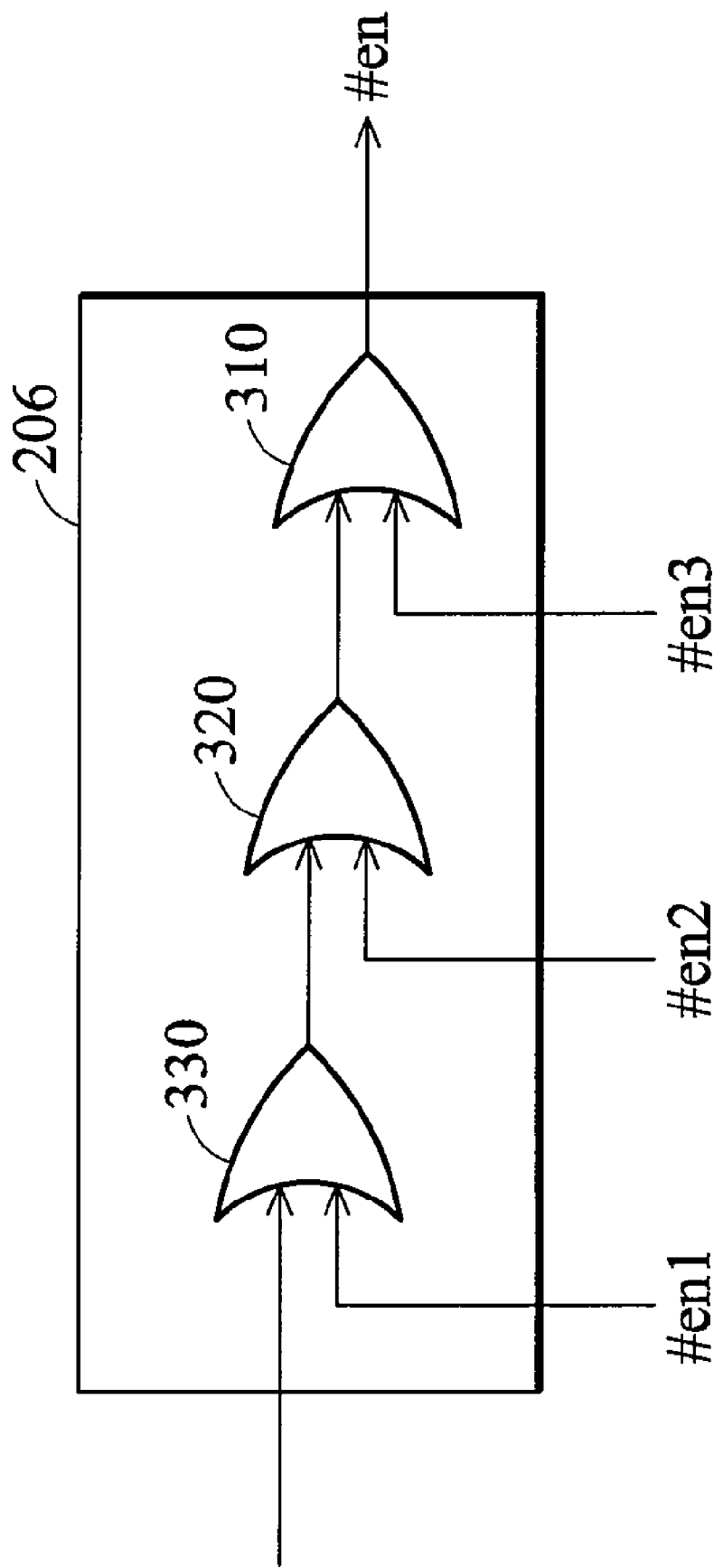
FIG. 3 shows an embodiment of an enablement unit 206 according to FIGS. 2a and 2b.

FIG. 3 shows an embodiment of an enablement unit 206 according to FIGS. 2a and 2b. Since the enable signal #en is asserted when any of the request signals #en1, #en2 and #en3 is asserted, the enablement unit 206 may be implemented by OR gates 310, 320 and 330 serially cascaded, each receiving a corresponding enable signal. Based on the serially coupled architecture, the number of OR gates may be extended if more than three modules are implemented in the communication system 200 or 201. As shown in FIGS. 2a and 2b, the first module 210 comprises an auto frequency controller 208 controlling the accuracy of first high frequency signal #HCLK1. The first module 210 usually works in a mobile environment with varying effects, thus auto frequency control (AFC) is required to adjust the first high frequency signal #HCLK1 to adapt the frequency variations in communication. The auto frequency controller 208 generates an adjustment signal #AFC to fine tune the high frequency oscillator 202. The auto frequency controller 208 is triggered when the first request signal #en1 is asserted. In the embodiment, the adjustment signal #AFC is generated based on the enable signal #en.

Figure 1:
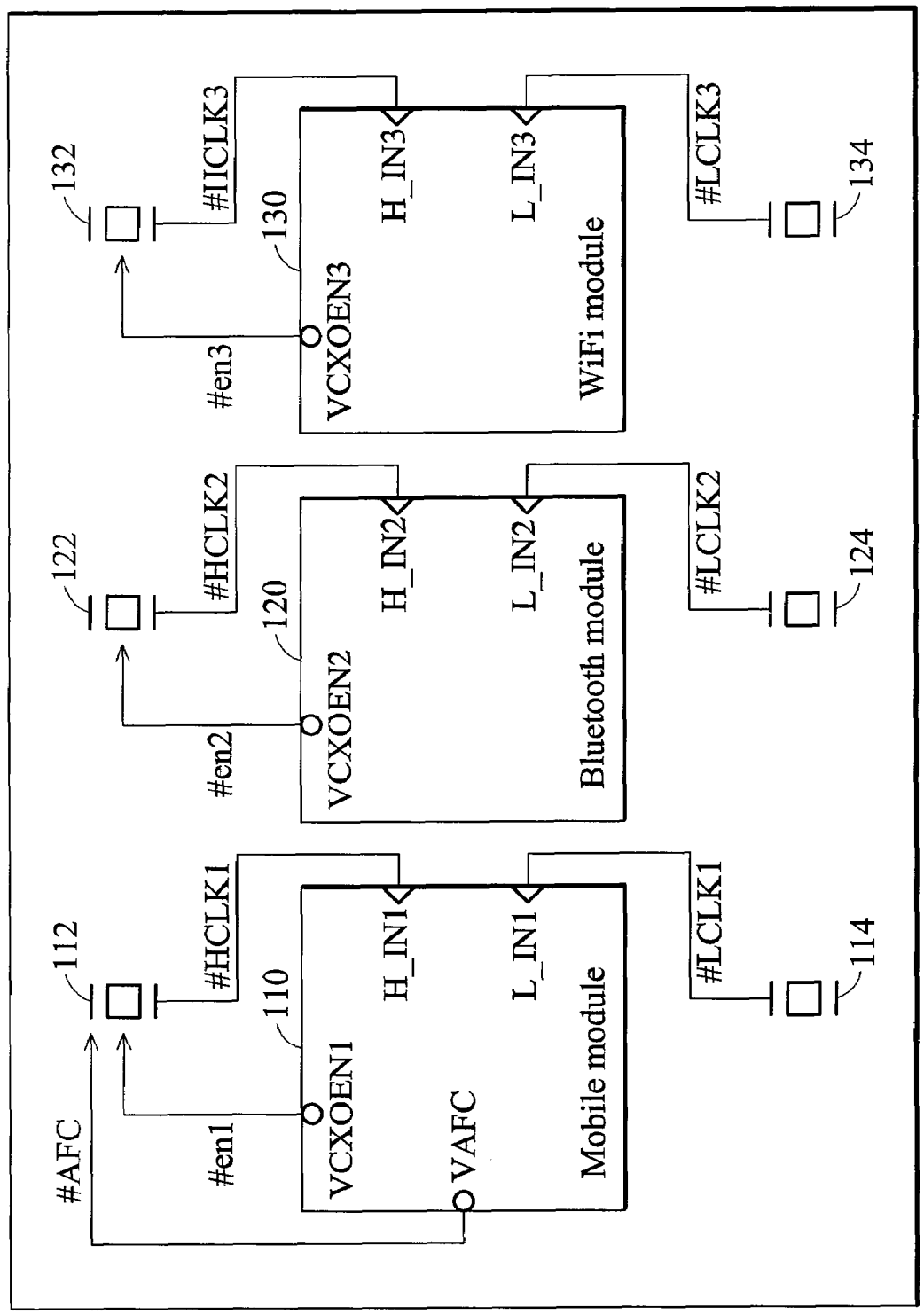
FIG. 1 shows a conventional communication system 100.
Figure 4:
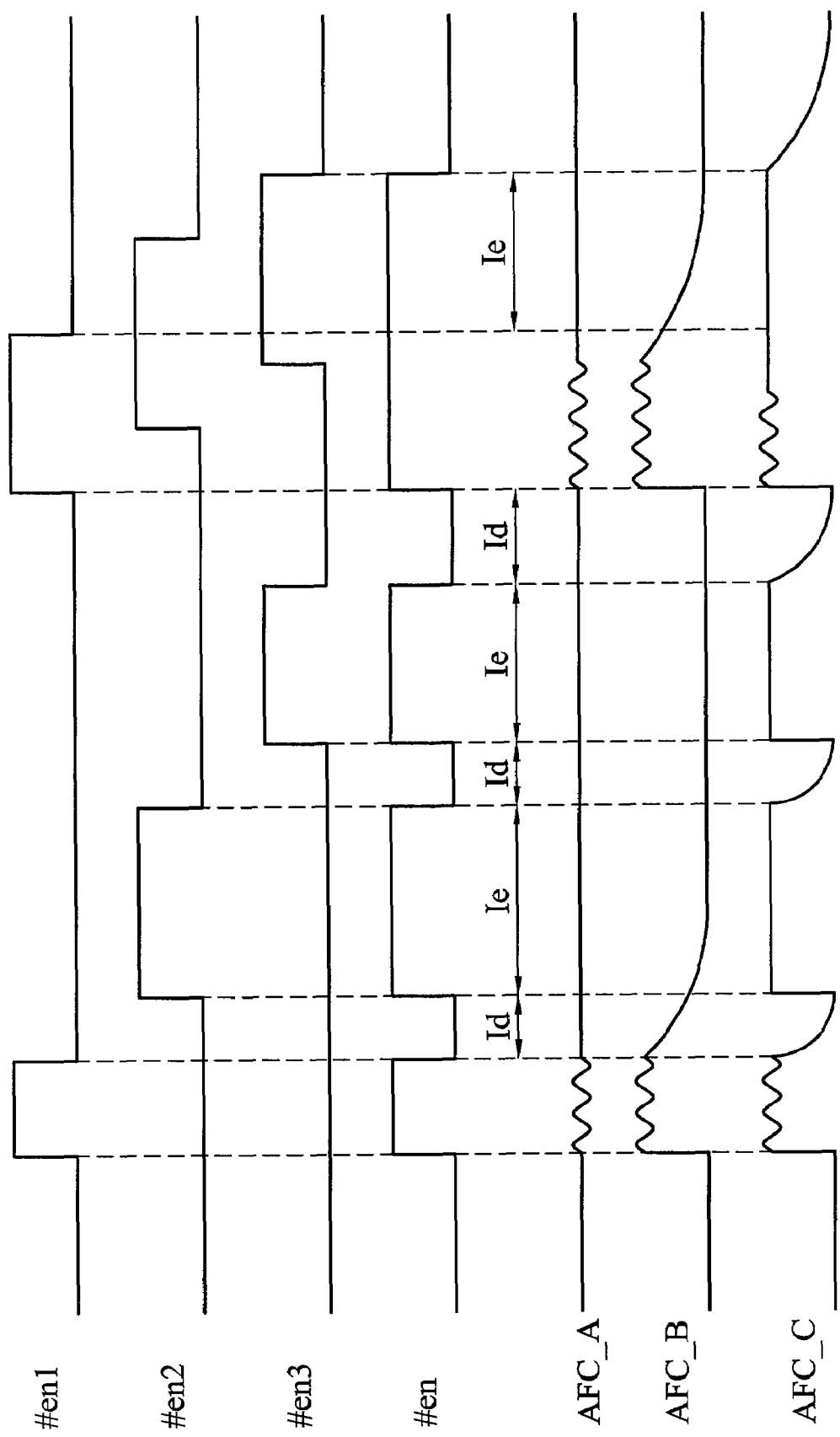
FIG. 4 shows a waveform of the enable signals and auto frequency control (AFC) signals.

FIG. 4 shows a waveform of the enable signals and the adjustment signals. The voltage curves AFC_A and AFC_B show voltage states of the adjustment signal #AFC in two conventional cases based on the architecture in FIG. 1. When the first request signal #en1 is asserted, the voltages AFC_A and AFC_B rapidly wobble as the auto frequency control proceeds. When the first request signal #en1 is disabled, the voltage AFC_A stays at a constant high level, whereas the voltage AFC_B is uncharged to a low level. If the voltages AFC_A and AFC_B are used in the architecture of FIGS. 2a and 2b, disadvantages may occur. In the intervals Id where all the request signals #en1, #en2 and #en3 are not active, the voltage AFC_A staying high is considered wasteful. Additionally, in the intervals 1e where request signals #en2 or #en3 are enabled, the voltage AFC_B of low level causes the high frequency oscillator 202 to generate inaccurate first high frequency signal #HCLK1. To solve the disadvantages, the auto frequency controller 208 in FIGS. 2a and 2b is triggered based on the enable signal #en sent from the enablement unit 206, and the voltage status of the adjustment signal #AFC is shown as voltage AFC_C. When any of the request signals #en, #en2 and #en3 is enabled, the enable signal #en is enabled, and the voltage AFC_C is sent as the adjustment signal #AFC to maintain the accuracy of first high frequency signal #HCLK1. During the intervals Id where none of the request signals #en1, #en2 and #en3 are asserted, the voltage AFC_C is uncharged to reduce the power consumption.

Figure 5:
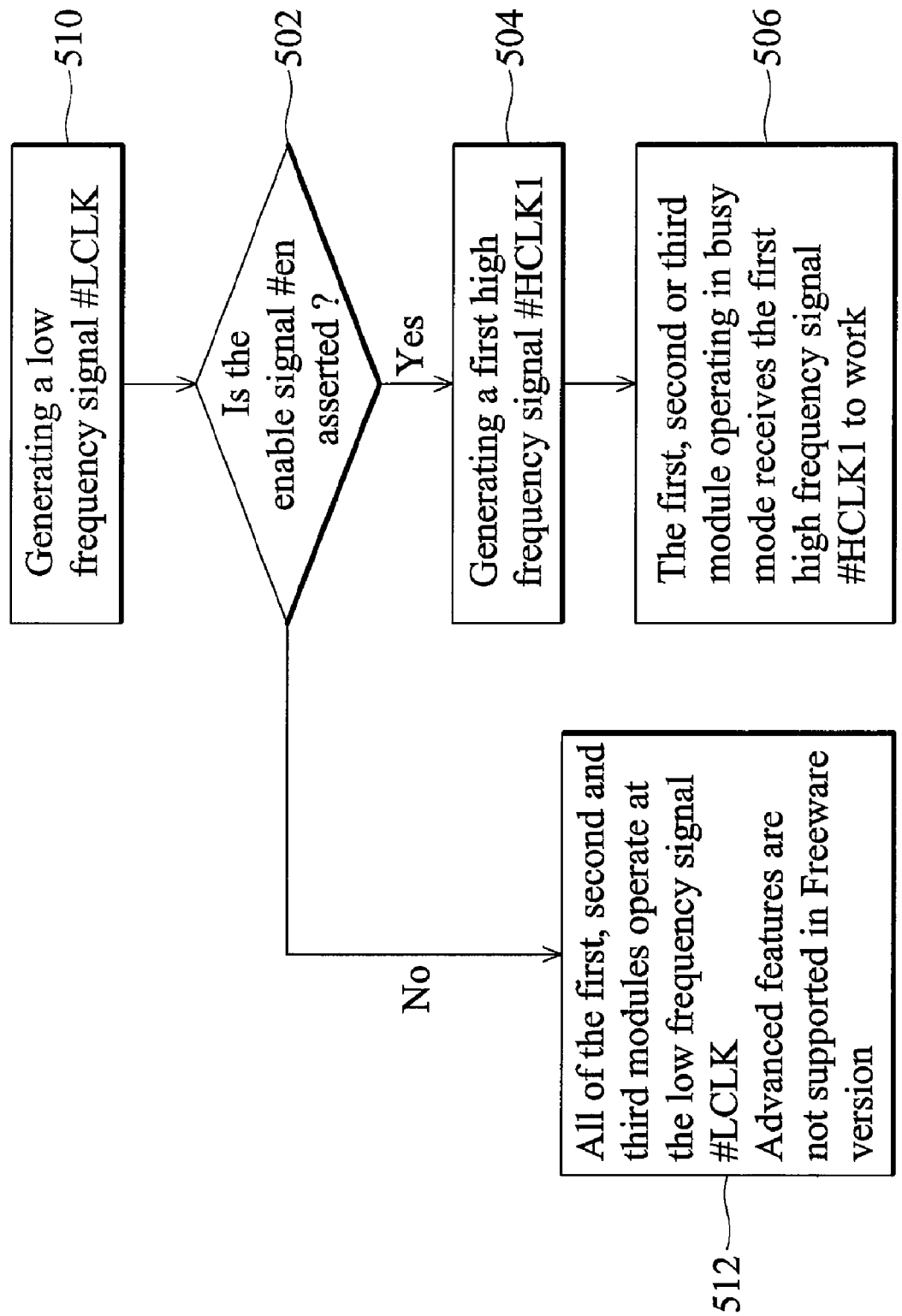
FIG. 5 is a flowchart of the oscillation signal provision method.

FIG. 5 is a flowchart of the oscillation signal provision method. The low frequency signal #LCLK is generated in step 510. In step 502, it is determined whether the enable signal #en has been asserted. If so, the first high frequency signal #HCLK1 is generated in step 504. In step 506, any of the first module 210, second module 220 and third module 230 which operates in busy mode utilizes the first high frequency signal #HCLK1 while the remainder of the first module 210, second module 220 and third module 230 which operates in idle mode utilizes the low frequency signal #LCLK. If the enable signal #en is not asserted, all of the first module 210, second module 220 and third module 230 are in idle mode, and as shown in step 512, all of them operate at the low frequency signal #LCLK.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system comprising:
   a high frequency oscillator, generating a first high frequency signal upon receipt of an enable signal;

a first module, coupled to the high frequency oscillator, operating in either busy or idle mode, wherein the first module operates at the first high frequency signal when in busy mode; and a second module, coupled to the high frequency oscillator, operating in either busy or idle mode, wherein the second module converts the first high frequency signal to a second high frequency signal and operates at the second high frequency signal when in busy mode; wherein the high frequency oscillator ceases generating the first high frequency signal when the enable signal is not asserted;

further comprising an oscillation source providing a low frequency signal; wherein the first module is coupled to the low frequency oscillator, operating at the low frequency signal when in idle mode.

2. The communication system as claimed in claim 1, wherein the high frequency oscillator comprises:

a first high oscillator, generating the first high frequency signal; and a first buffer, coupled to the first high oscillator, amplifying the gain of the first high frequency signal before output to the first module and second module.

3. The communication system as claimed in claim 1, further comprising a low frequency oscillator, comprising:

an oscillation source, generating a low frequency signal; and a second buffer, coupled to the oscillation source, amplifying the gain of the low frequency signal; wherein the first module and second module are coupled to the low frequency oscillator, individually operating at the low frequency signal when in idle mode.

4. The communication system as claimed in claim 1, wherein:

the first module is coupled to the second module, amplifying and passing the low frequency signal to the second module; and the second module operates at the low frequency signal when in idle mode.

5. The communication system as claimed in claim 1, wherein the second module comprises:

a first PLL circuit, receiving the first high frequency signal and generating a second high frequency signal; and an operation module, coupled to the first PLL circuit, operating at the second high frequency signal in busy mode.

6. The communication system as claimed in claim 1, wherein the first module is a mobile phone chip.

7. The communication system as claimed in claim 1, wherein the second module is a Bluetooth chip.

8. The communication system as claimed in claim 1, wherein the second module is a WiFi chip.

9. The communication system as claimed in claim 1, wherein:

the first module asserts a first request signal when the first module operates in busy mode;

the second module asserts a second request signal when the second module operates in busy mode;

the communication system further comprises a enablement unit, coupled to the first module and second module for generation of the enable signal; and when any of the first request signal and second request signal is asserted, the enablement unit generates the enable signal to the high frequency oscillator.

10. The communication system as claimed in claim 9, wherein the enablement unit comprises an OR gate, triggered by the first request signal or second request signal to generate the enable signal.

11. The communication system as claimed in claim 9, wherein:

the first module comprises an automatic frequency controller coupled to the high frequency oscillator, generating an adjustment signal to maintain the accuracy of first high frequency signal upon receipt of the enable signal; and the automatic frequency controller ceases generating the adjustment signal when the enable signal is not asserted.

12. An oscillation signal provision method for a first module and a second module each operating in either busy or idle modes, the method comprising:

generating a first high frequency signal when an enable signal is asserted;

the first module operating at the first high frequency signal when in busy mode;

the second module converting the first high frequency signal to a second high frequency signal and operating at the second high frequency signal when in busy mode; and ceasing generating the first high frequency signal when the enable signal is not asserted;

further comprising:

providing a low frequency signal; and the first module receiving and operating at the low frequency signal when an idle mode.

13. The oscillation signal provision method as claimed in claim 12, wherein generation of first high frequency signal comprises amplifying the gain of the first high frequency signal and sending to the first module and second module.

14. The oscillation signal provision method as claimed in claim 12, further comprising:

providing a low frequency signal;

amplifying the gain of the low frequency signal and sending to the first module and second module; and the first module or second module operating at the low frequency signal when in idle mode.

15. The oscillation signal provision method as claimed in claim 12, further comprising:

the first module amplifying and passing the low frequency signal to the second module; and the second module operating at the low frequency signal when in idle mode.

16. The oscillation signal provision method as claimed in claim 12, wherein the first module is a mobile phone chip.

17. The oscillation signal provision method as claimed in claim 12, wherein the second module is a Bluetooth chip.

18. The oscillation signal provision method as claimed in claim 12, wherein the second module is a WiFi chip.

19. The oscillation signal provision method as claimed in claim 12, further comprising:

the first module asserting a first request signal when the first module operates in busy mode;

the second module asserting a second request signal when the second module operates in busy mode; and when any of the first request signal and second request signal is asserted, the enable signal is asserted.

20. The oscillation signal provision method as claimed in claim 19, further comprising the first module performing an automatic frequency control to maintain the accuracy of first high frequency signal when the enable signal is asserted.

* * * * *